(12) United States Patent
Shrestha et al.

(10) Patent No.: US 9,389,336 B2
(45) Date of Patent: Jul. 12, 2016

(54) HYDROGEL MONOMER MIX CONTAINING ADDED WATER

(71) Applicant: Bausch & Lomb Incorporated, Rochester, NY (US)

(72) Inventors: Ritu Shrestha, Rochester, NY (US); Alok K. Awasthi, Pittsford, NY (US); Lynn F. Atwater, Ontario, NY (US); Jay Friedrich Kunzler, Canandaigua, NY (US); Richard Fanqing Meng, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 49 days.

(21) Appl. No.: 13/957,497

(22) Filed: Aug. 2, 2013

(65) Prior Publication Data

US 2014/0034519 A1    Feb. 6, 2014

(51) Int. Cl.
| C08L 101/14 | (2006.01) |
| C08L 33/10 | (2006.01) |
| C08L 39/06 | (2006.01) |
| G02B 1/04 | (2006.01) |
| A45C 11/04 | (2006.01) |

(52) U.S. Cl.
CPC .............. G02B 1/043 (2013.01); A45C 11/046 (2013.01)

(58) Field of Classification Search
None
See application file for complete search history.

(56) References Cited

U.S. PATENT DOCUMENTS

| 3,220,960 | A | * | 11/1965 | Lim et al. ................ 521/149 |
| 3,503,942 | A | * | 3/1970 | Seiderman .................. 526/320 |
| 5,006,622 | A | | 4/1991 | Kunzler et al. |
| 5,458,819 | A | | 10/1995 | Chirila et al. |
| 5,770,637 | A | | 6/1998 | Vanderlaan et al. |
| 8,138,290 | B2 | | 3/2012 | Blackwell et al. |
| 8,197,841 | B2 | | 6/2012 | Linhardt et al. |
| 2004/0116310 | A1 | * | 6/2004 | Kunzler et al. ............... 510/115 |
| 2007/0122540 | A1 | * | 5/2007 | Salamone et al. ........... 427/2.24 |
| 2007/0161810 | A1 | * | 7/2007 | Schorzman et al. .......... 556/418 |
| 2012/0035288 | A1 | * | 2/2012 | Chow et al. ................... 521/113 |
| 2012/0088861 | A1 | * | 4/2012 | Huang et al. ................. 523/107 |

FOREIGN PATENT DOCUMENTS

| CN | 101096451 A | 1/2008 |
| EP | 2369370 A2 | 9/2011 |
| EP | 2607404 A1 | 6/2013 |

OTHER PUBLICATIONS

International Search Report and Written Opinion of the International Searching Authority in corresponding International Application No. PCT/US2014/047610, dated Oct. 22, 2014 (10 pages).

French: Editorial—Why is modulus important (Nov. 25, 2014) 3 pages website—http://www.siliconehydrogels.org/editorials/oct_07.asp.

International Preliminary Report on Patentability in corresponding International Application No. PCT/US2014/047610, completed Oct. 22, 2015 (5 pages).

* cited by examiner

Primary Examiner — Peter A Salamon
(74) Attorney, Agent, or Firm — Toan P. Vo

(57) ABSTRACT

Provided herein is a polymerized product formed of a polymerized monomer mixture comprising intentionally added water and at least one hydrophilic monomer wherein the monomer mix does not contain any silicon containing materials. The polymerized monomer mixture of the invention herein is useful in many biomaterial applications. Especially preferred is the use of the biomaterial as a hydrogel contact lens.

14 Claims, 1 Drawing Sheet

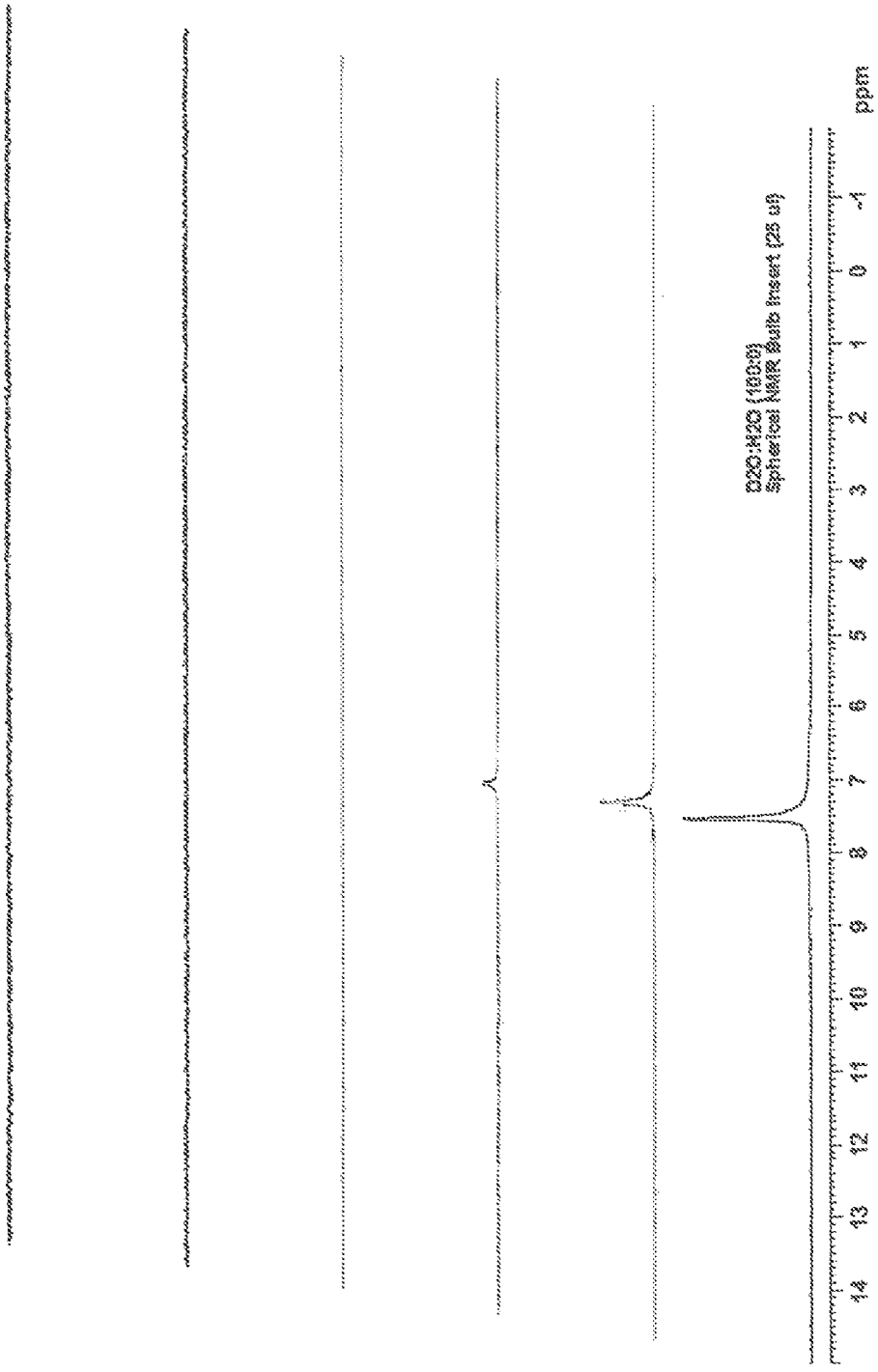

HYDROGEL MONOMER MIX CONTAINING ADDED WATER

PRIORITY CLAIMS TO PRIOR APPLICATIONS

None

FIELD

The present application relates to novel monomer mixtures for forming traditional hydrogels comprising intentionally added water in the monomer mix, wherein the monomer mix is free of any silicon containing compounds and is useful in certain specific embodiments in the manufacture of biocompatible medical devices (i.e., biomaterials).

BACKGROUND AND SUMMARY

It has been observed that conventional (traditional) hydrogel formulations, such as those containing non-silicone containing hydrogel forming comonomers such as N-vinylpyrrolidone (NVP), 2-hydroxy methacrylate (HEMA), ethyleneglycoldimethacrylate (EGDMA) and other hydrophilic monomers along with other traditional hydrogel forming materials such as diluent, strengthening agents, crosslinkers, initiator, optionally UV blocker and visibility tint; do not tend to have all of the desirable properties such as high Dk (a measure of oxygen permeability) that may be found in other contact lens forming materials such as silicone hydrogels. The invention disclosed herein provides a surprising and unexpected solution to the challenges found in many traditional hydrogel applications, for example, contact lens materials.

SUMMARY OF THE INVENTION

Provided herein is an article of manufacture formed of a polymerized monomer mixture comprising intentionally added water and at least one hydrophilic monomer wherein the monomer mix does not contain any silicon containing materials. The polymerized monomer mixture of the invention herein is useful in many biomaterial applications. Biomaterials appropriate for use with the polymerized hydrogel forming article of manufacture of the invention herein would include scaffolds in tissue engineering, scaffolds containing human cells, environmentally sensitive hydrogels including hydrogels having the ability to sense changes of pH, temperature, or the concentration of metabolite; control-release delivery systems, hydrogel products to provide absorption, desloughing and debriding capacities of necrotics and fibrotic tissue; artificial heart valves, buttons for lathing lenses, films, surgical devices, vessel substitutes, intrauterine devices, membranes, diaphragms, surgical implants, artificial blood vessels, artificial ureters, artificial breast tissue and membranes intended to come into contact with body fluid outside of the body, e.g., membranes for kidney dialysis and heart/lung machines and the like, catheters, mouth guards, denture liners, cosmetics, ophthalmic devices, and especially hydrogel contact lenses. Especially preferred is the use of the biomaterial as a hydrogel contact lens.

It has surprisingly been discovered by the inventors that conventional hydrogel forming monomer mixture materials can be used along with intentionally added water in the monomer mixture formulation to increase the water content and, in turn, oxygen transmissibility of these materials once they have been subjected to polymerization conditions and then extracted/hydrated. This approach however has not been shown to work with silicone hydrogel forming monomer mixes. Through rigorous experimentation, it has been surprisingly discovered that the unexpected enhancement in certain properties of hydrogels prepared from the inventive monomer mix is due to the intentional water added to the monomer mix prior to polymerization and not from any water which may already be present in any of the comonomers and other traditional hydrogel forming materials adsorbed/absorbed from their storage environment prior to addition to the monomer mix subsequently subjected to polymerization conditions.

BRIEF DESCRIPTION OF THE DRAWINGS

FIG. 1 is a Solid state NMR experiment of Example 1 lenses in NMR solvent ($H_2O$ in this case) spiked with 20% $D_2O$.

DETAILED DESCRIPTION

Unless clearly stated otherwise all materials used in forming a monomer or monomer mix are listed as weight percent. Also, unless clearly stated otherwise it will be understood that all amounts of materials used to make the monomers and monomer mixes disclosed herein represent the statistical mean of a normal distribution of weight values such as are ordinarily encountered in the laboratory or commercial manufacture of the monomers and monomer mixes disclosed herein. Therefore, unless clearly stated otherwise all numerical values, including those in the Claims, shall be understood as being modified by the term "about".

The term "monomer" as used herein refers to varying molecular weight compounds (i.e. typically having number average molecular weights from about 300 to about 100,000) that can be polymerized, and to medium to high molecular weight compounds or polymers, sometimes referred to as macromonomers, (i.e., typically having number average molecular weights greater than 600) comprising functional groups capable of further polymerization. Thus, it is understood that the terms "monomers", and "hydrophilic monomers" include monomers, macromonomers and prepolymers. Prepolymers are partially polymerized monomers or monomers which are capable of further polymerization.

In yet another aspect, the application includes any article of manufacture or composition of matter formed of a monomer mix containing intentionally added water as part of the monomer mix and wherein the monomer mix does not contain any silicon containing material. These articles would include, for example, any article that hydrogels have been traditionally used for. For example, common uses for hydrogels include without limitation scaffolds in tissue engineering, scaffolds containing human cells, environmentally sensitive hydrogels, i.e., hydrogels having the ability to sense changes of pH, temperature, or the concentration of metabolite, control-release delivery systems, hydrogel products to provide absorption, desloughing and debriding capacities of necrotics and fibrotic tissue as well as many other uses.

In yet another aspect, the application includes any article of manufacture or composition of matter formed of a monomer mix containing intentionally added water as part of the monomer mix and wherein the monomer mix does not contain any silicon containing material. Such an article may be useful in certain embodiments for forming a wide variety of articles of manufacture, e.g., soft ophthalmic materials for implantation on or in an eye. Especially preferred articles of manufacture are ophthalmic lenses including contact lenses. Although all polymeric traditional hydrogel materials are envisioned as being within the scope of this invention so long as the monomer mixture they are polymerized from contains some amount of intentionally added water to the monomer mix prior to the mix being subjected to polymerization conditions, preferably the article of manufacture is selected from the group consisting of biomaterials, adhesives and cosmetics. Preferred articles of manufacture are optically clear and useful as a contact lens.

The article of manufacture may be made of a polymerized monomer containing intentionally added water as claimed in this application and in further embodiments can provide medical devices such as artificial heart valves, buttons for lathing lenses, films, surgical devices, vessel substitutes, intrauterine devices, membranes, diaphragms, surgical implants, artificial blood vessels, artificial ureters, artificial breast tissue and membranes intended to come into contact with body fluid outside of the body, e.g., membranes for kidney dialysis and heart/lung machines and the like, catheters, mouth guards, denture liners, ophthalmic devices, and especially hydrogel contact lenses.

As set forth above, unless clearly stated otherwise it will be understood that all amounts of materials used to make the monomers and monomer mixes disclosed herein represent the statistical mean of a normal distribution of weight values such as are ordinarily encountered in the laboratory or commercial manufacture of the monomers and monomer mixes disclosed herein. Therefore, unless clearly stated otherwise, all numerical values wherever they may occur within the entirety of this patent specification shall be understood as being modified by the term "about".

In certain preferred embodiments of the invention disclosed herein useful concentrations of the intentionally added water in the monomer mix of the invention as claimed in this application herein would include 10 to 33 percent by weight of the monomer mix. Other embodiments would have concentrations including 10 to 20 percent by weight. Further embodiments would have concentrations including 10 to 15 percent by weight. Further embodiments would have concentrations including 15 to 33 percent by weight. Further embodiments would have concentrations including 15 to 20 percent by weight. Further embodiments would have concentrations including 20 to 33 percent by weight.

Preferred compositions of the monomer mix of the invention herein have both hydrophilic and hydrophobic monomers. Depending upon the specific application, useful articles made with these materials may require hydrophobic monomers. These hydrophobic monomers, when present, are 0.1 to 60 percent by weight of the total monomer mixture. Examples of no silicon comprising hydrophobic monomers include alkyl acrylates, alkyl methacrylates and allyl acrylates and allyl methacrylates.

Novel hydrogels according to certain preferred embodiments of the invention herein are prepared by polymerizing a mixture comprising at least one hydrophilic monomer and at least 10 wt. % of intentionally added water in the monomer mix. In certain preferred embodiments, a crosslinking agent (a crosslinker being defined as a monomer having multiple polymerizable functionalities) or other separate crosslinker may be employed. In certain embodiments hydrophobic crosslinkers are used. Examples of hydrophobic crosslinkers would include methacrylates such as ethylene glycol dimethacrylate (EGDMA) and allyl methacrylate (AMA). In certain other preferred embodiments hydrophilic crosslinkers might be used. Amounts of cross-linker, either hydrophobic or hydrophilic, each type either separate or combined in any combination, would be present at between 0 to 76 percent by weight, 2 to 20 percent by weight or 5 to 13 percent by weight.

The monomer mix containing intentionally added water and at least one hydrophilic monomer of the application herein may be copolymerized with a wide variety of hydrophilic monomers to produce medical devices such as hydrogel lenses.

Suitable hydrophilic monomers include: unsaturated carboxylic acids, such as methacrylic and acrylic acids; acrylic substituted alcohols, such as 2-hydroxyethyl methacrylate and 2-hydroxyethyl acrylate; vinyl lactams, such as N-vinylpyrrolidone (NVP) and 1-vinylazonan-2-one; and acrylamides, such as methacrylamide and N,N-dimethylacrylamide (DMA). These hydrophilic monomers will be present in certain embodiments, separately or by combined weight, in amounts of between 0 to 60 percent by weight, between 20 to 45 percent by weight, between 0 to 48.6 percent by weight, between 0 to 30 percent by weight, between 0 to 25 percent by weight, between 0 to 9.5 percent by weight or between 2 to 7 percent by weight.

An organic diluent may be included in the initial monomeric mixture. As used herein, the term "organic diluent" encompasses organic compounds which minimize incompatibility of the components in the initial monomeric mixture and are substantially nonreactive with the components in the initial mixture. Additionally, the organic diluent serves to minimize phase separation of polymerized products produced by polymerization of the monomeric mixture. Also, the organic diluent will generally be relatively non-inflammable.

Contemplated organic diluents include alcohols such as tert-butanol (TBA), tert-amyl alcohol, hexanol and nonanol; dials, such as ethylene glycol; and polyols, such as glycerol. Preferably, the organic diluent is sufficiently soluble in the extraction solvent to facilitate its removal from a cured article during the extraction step. Other suitable organic diluents would be apparent to a person of ordinary skill in the art.

The organic diluent is included in an amount effective to provide the desired effect (for example, minimal phase separation of polymerized products). Generally, the diluent is included at 0 to 60% by weight of the monomeric mixture, with 1 to 40% by weight being more preferred, 2 to 30% by weight being even more preferred and 3 to 25% by weight being especially preferred.

According to the present invention, the monomeric mixture, comprising intentionally added water at least one hydrophilic monomer, and optionally an organic diluent, is shaped and cured by conventional methods such as static casting or spin casting.

Lens formation can be by free radical polymerization reactants such as are obtained by using initiators such as azobisisobutyronitrile (AIBN) or peroxide catalysts under conditions such as those set forth in U.S. Pat. No. 3,808,179, incorporated herein by reference; photoinitiation of free radical polymerization of the monomer mixture using photo initiators such as IRGACURE 819 (Bis(2,4,6-trimethylbenzoyl)-phenylphosphineoxide) and DAROCURE 1173 (2-Hydroxy-2-methyl-1-phenyl-propan-1-one) are also well known in the art and may be used in the process of forming an article as disclosed herein.

By careful selection of the appropriate wavelength of light to conduct photo polymerization of the monomer mix a finished product having desirable properties such as surface hydrophilicity and surface lubricity can result. Other reaction conditions important to photo polymerization would include incident light intensity, light exposure time and controlled atmosphere can also be critical to providing a successful commercial product. Suitable light intensity will depend upon polymerization conditions such as the mold material, monomer mix and initiator concentration ratio. For example, suitable intensities would range from 1.0 mW/cm2 to 25.0 mW/cm2. Similarly, light exposure time can vary, depending upon polymerization conditions. Therefore, light exposure time may range from one minute to 60 minutes. Control of atmospheric conditions for polymerizing contact lenses is well known in the art. Colorants and the like may be added to the mixture prior to monomer polymerization.

Subsequently to the monomer mixture being subjected to polymerization conditions, a sufficient amount of unreacted monomer and, when present, organic diluent is removed from the cured article to improve the biocompatibility of the article. Release of non-polymerized monomers into the eye upon installation of a lens can cause irritation and other problems. Therefore, once the biomaterials formed from the polymerized monomer mix comprising intentionally added water and at least on hydrophilic monomer of the application herein and optionally, at least one of the other monomers disclosed herein are formed they are then extracted to prepare them for packaging and eventual use. Extraction is accomplished by exposing the polymerized materials to various solvents such as water, 2-propanol, etc. for varying periods of time. For example, one extraction process is to immerse the polymerized materials in water for about three minutes, remove the water and then immerse the polymerized materials in another aliquot of water for about three minutes, remove that aliquot of water and then autoclave the polymerized material in water, buffer solution or other packaging solution.

Surface structure and composition determine many of the physical properties and ultimate uses of solid materials. Characteristics such as wetting, friction, and adhesion or lubricity are largely influenced by surface characteristics. The alteration of surface characteristics is of special significance in biotechnical applications where biocompatibility is of particular concern. It should be remembered that in coating medical devices the term "surface" is not to be limited to meaning "at least one complete surface". Surface coverage does not have to be even or complete to be effective for surface functionality or surface treatment. Thus, it is desired to provide a hydrogel contact lens with an optically clear, hydrophilic surface film that will not only exhibit improved wettability, but which will generally allow the use of the hydrogel contact lens in the human eye for an extended period of time.

It may also be desirable to apply these surface enhancing coatings to implantable medical devices such as tissue scaffold materials to reduce the attachment of non-desirable epithelial cells to the implanted device. Therefore, if needed to produce a successful commercial product the polymerized materials prepared from the monomer mixture comprising intentionally added water may optionally be coated.

Methods of coating contact lenses and various types of coatings for contact lenses are well known to those of ordinary skill in the art. Methods of coating the substrate include dip coating of the substrate into a solution comprising the surface coating material. The solution comprising the surface coating material may contain substantially the surface coating material in solvent or may contain other materials such as cleaning and extracting materials. Other methods could include spray coating the device with the surface coating material. In certain embodiments, it may be necessary to use suitable catalysts, for example, a condensation catalyst. Alternatively, the substrate and the other surface coating material may be subjected to autoclave conditions. In certain embodiments, the substrate and the surface coating material may be autoclaved in the packaging material that will contain the coated substrate. Once the interaction between the substrate and the surface coating material has occurred, the remaining surface modifying agent could be substantially removed and packaging solution added to the substrate packaging material. Sealing and other processing steps then proceed as they usually do. Alternatively, the surface modifying agent could be retained in the substrate packaging material during storage and shipping of the substrate device to the end user.

Coatings for medical devices are typically oligomeric or polymeric and sized to provide suitable properties to the surface of the medical device to be coated. Coatings according to certain embodiments of the application herein will typically contain hydrophilic domain(s) showing good surface properties when the coating is associated with the substrate (i.e., the uncoated medical device). The hydrophilic domain(s) will comprise at least one hydrophilic monomer, such as, HEMA, glyceryl methacrylate, methacrylic acid ("MAA"), acrylic acid ("AA"), methacrylamide, acrylamide, N,N'-dimethylmethacrylamide, or N,N'-dimethylacrylamide; copolymers thereof; hydrophilic prepolymers, such as ethylenically unsaturated poly(alkylene oxide)s, cyclic lactams such as N-vinyl-2-pyrrolidone ("NVP"), or derivatives thereof. Still further examples are the hydrophilic vinyl carbonate or vinyl carbamate monomers. Hydrophilic monomers can be nonionic monomers, such as 2-hydroxyethyl methacrylate ("HEMA"), 2-hydroxyethyl acrylate ("HEA"), 2-(2-ethoxyethoxy)ethyl(meth)acrylate, glyceryl(meth)acrylate, poly(ethylene glycol(meth)acrylate), tetrahydrofurfuryl (meth)acrylate, (meth)acrylamide, N,N'-dimethylmethacrylamide, N,N'-dimethylacrylamide ("DMA"), N-vinyl-2-pyrrolidone (or other N-vinyl lactams), N-vinyl acetamide, and combinations thereof. Still further examples of hydrophilic monomers are the vinyl carbonate and vinyl carbamate monomers disclosed in U.S. Pat. No. 5,070,215, and the hydrophilic oxazolone monomers disclosed in U.S. Pat. No. 4,910,277. The contents of these patents are incorporated herein by reference. The hydrophilic monomer also can be an anionic monomer, such as 2-methacryloyloxyethylsulfonate salts. Substituted anionic hydrophilic monomers, such as from acrylic and methacrylic acid, can also be utilized wherein the substituted group can be removed by a facile chemical process. Non-limiting examples of such substituted anionic hydrophilic monomers include trimethylsilyl esters of (meth)acrylic acid, which are hydrolyzed to regenerate an anionic carboxyl group. The hydrophilic monomer also can be a cationic monomer selected from the group consisting of 3-methacrylamidopropyl-N,N,N-trimethyammonium salts, 2-methacryloyloxyethyl-N,N,N-trimethylammonium salts, and amine-comprising monomers, such as 3-methacrylamidopropyl-N,N-diethyl amine. Other suitable hydrophilic monomers will be apparent to one skilled in the art.

Generally, a packaging system for the storage of an ophthalmic lens according to the present application includes at least a sealed container comprising one or more unused ophthalmic lenses immersed in an aqueous lens packaging solution. Preferably, the sealed container is a hermetically sealed blister-pack, in which a concave well comprising a contact lens is covered by a metal or plastic sheet adapted for peeling in order to open the blister-pack. The sealed container may be any suitable generally inert packaging material providing a reasonable degree of protection to the lens, preferably a plastic material such as polyalkylene, PVC, polyamide, and the like.

Based upon empirical observations, packaging solutions that provide a material having a sessile drop contact angle less than about 75 degrees are relatively hydrophilic and tend to easily slide about a hydrophobic surface such as that provided by a polystyrene Petri dish when a force such as applied by a hand held scalpel is used to slice the material (in this case a molded contact lens). Other packaging materials that provide a material having a sessile drop contact angle greater than about 75 degrees are relatively hydrophobic and tend to adhere to a hydrophobic surface such as that provided by a polystyrene Petri dish. Therefore a medical device packaged with a borate buffered polyphosphorylcholine solution is a preferred embodiment of the application herein.

Suitable packaging solution material selection will depend upon a particular lens formulation and is therefore somewhat broad in nature. Below are non-limiting examples of representative cationic, anionic, and zwitterionic polymers or components, along with non-ionic surfactants and peptide-based materials which are useful in packaging solutions (depending upon the intended use).

Anionic Polymers
   Poly(acrylic acid)
   Poly(acrylamide-co-acrylic acid)
   Carboxymethylcellulose
Cationic Polymers
   Polymer JR
   Polymers having latent amines
Zwitterionic Components
   Phosphocholine
   Latent amino acids
Polypeptides
   Poly(glutamic acid)
   Poly(lysine)
Non-Ionic Surfactants
   Tetronic T1107
   Tetronic T908
   Hydroxypropyl methylcellulose
   Silicone surfactants (NVP-co-TRIS VC)
   Glycereth cocoate
   C18-PVP For the limited purpose of illustrating the use of a conditioning agent, any suitable nonionic polymeric conditioning agent component may be employed in accordance with the present application provided that it functions as described herein and has no substantial detrimental effect on the contact lens being stored or on the wearer of the contact lens. This component is ophthalmically acceptable at the concentrations used. Particularly useful components are those, which are water soluble, for example, soluble at the concentrations used in the presently useful liquid aqueous packaging media.

These compounds condition the lens by providing one or more of the following attributes: increased viscosity for increased retention time on the lens; enhanced wetting of the lens surface; decreased surface friction (i.e., improved lubricity); or enhanced comfort of a contact lens by forming a cushioning film over the lens surface.

A class of nonionic, polymeric conditioning agents includes nonionic polysaccharides. Representative examples of suitable components for use herein include, but are not limited to, methylcellulose; hydroxyethylcellulose; hydroxypropylcellulose; hydroxypropylmethylcellulose; and methylhydroxyethylstarches.

Another class of nonionic, polymeric conditioning agents includes polyvinylalcohols and polyvinylpyrrolidones.

Another class of nonionic, polymeric conditioning agents includes polymers of PEO, including PEO homopolymers, and block copolymers of PEO and PPO. This class includes poloxamers and poloxamines, including those disclosed in U.S. Pat. No. 6,440,366.

The above classes of nonionic, polymeric conditioning agents are intended for illustrative purposes only and not to limit the scope of the present application. Such polymers are known to those of skill in the art.

Generally, the average molecular weight of nonionic, polymeric conditioning agent is a minimum of about 1 kDa and a maximum of about 700 kDa, more preferably, about 5 kDa to 500 kDa.

The amount of nonionic, polymeric conditioning agent employed is that amount effective to improve the surface properties of the ophthalmic device when combined with a nonionic, nonpolymeric polyol. Preferably the nonionic, polymeric conditioning agent is present in the packaging solution of the application in an amount of at least 0.01% w/v. The specific amount of such component used can vary widely depending on a number of factors, for example, the specific polymeric component and nonionic polyol being employed. Generally, the concentration of the nonionic, polymeric conditioning agent is from about 0.01 to about 10% w/w and preferably from about 0.5 to about 1.5% w/w.

In one embodiment, the nonionic, nonpolymeric polyol for use herein can be a nonionic polyol comprising 2 to about 12 carbon atoms and preferably 2 to 4 carbon atoms and from 2 to 8 hydroxyl groups. Representative examples of such nonionic polyols include glycerin, ethylene glycol, propylene glycol, sorbitol, mannitol, monosaccharides, disaccharides such as trehalose, and the like and mixtures thereof. In one embodiment, the nonionic polyol can be glycerin, ethylene glycol, sorbitol, mannitol, and mixtures thereof.

The amount of the nonionic, nonpolymeric polyol in the packaging solution will generally be an amount sufficient to form a more uniform coating on the surface of the lens when packaged in a packaging solution according to the present application. In general, the concentration of the nonionic polyol will ordinarily range from about 0.01 to about 10% w/w and preferably from about 0.1 to about 3.0% w/w.

The packaging solutions according to the present application are physiologically compatible. Additionally, the solution must be "ophthalmically safe" for use with a lens such as a contact lens, meaning that a contact lens treated with the solution is generally suitable and safe for direct placement on the eye without rinsing, that is, the solution is sate and comfortable for daily contact with the eye via a contact lens that has been wetted with the solution. An ophthalmically safe solution has a tonicity and pH that is compatible with the eye and includes materials, and amounts thereof, that are non-cytotoxic according to ISO standards and U.S. Food & Drug Administration (FDA) regulations. The solution should be sterile in that the absence of microbial contaminants in the product prior to release must be statistically demonstrated to the degree necessary for such products. The liquid media useful in the present application are selected to have no substantial detrimental effect on the lens being treated or cared for and to allow or even facilitate the present lens treatment or treatments. The liquid media are preferably aqueous-based. A particularly useful aqueous liquid medium is that derived from saline, for example, a conventional saline solution or a conventional buffered saline solution.

The pH of the present packaging solutions should be maintained within the range of about 6.0 to about 8, and preferably about 6.5 to about 7.8. Suitable buffers may be added, such as: phosphate; borate; citrate; carbonate; tris-(hydroxyethyl) amino methane (TRIS); bis(2-hydroxyethyl)-amino-tris-(hydroxyethyl)amino alcohol (bis-tris); zwitterionic buffers such as N-[2-Hydroxy-1,1-bis(hydroxyethyl)ethyl]glycine (Trichina) and N-[2-Hydroxy-1,1-bis(hydroxyethyl)ethyl]glycine, MOPS; N-(Carbamoylmethyl)taurine (ACES); amino acids and amino acid derivatives; and mixtures thereof. Generally, buffers will be used in amounts ranging from about 0.05 to about 2.5 percent by weight, and preferably from about 0.1 to about 1.5 percent by weight of the solution. The packaging solutions of this application preferably contain a borate buffer, comprising one or more of boric acid, sodium borate, potassium tetra borate, potassium met borate or mixtures of the same.

If needed, the packaging solutions of the present application may be adjusted with tonicity agents, to approximate the osmotic pressure of normal lacrimal fluids, which is equivalent to a 0.9 percent solution of sodium chloride or 2.5 percent of glycerol solution. The solutions are made substantially isotonic with physiological saline used alone or in combination, otherwise if simply blended with sterile water and made hypotonic or made hypertonic the lenses will lose their desirable optical parameters. Correspondingly, excess saline may result in the formation of a hypertonic solution, which will cause stinging, and eye irritation.

Examples of suitable tonicity adjusting agents include, but are not limited to, sodium and potassium chloride, dextrose, calcium and magnesium chloride and the like and mixtures thereof. These agents are typically used individually in amounts ranging from about 0.01 to about 2.5% w/v and preferably from about 0.2 to about 1.5% w/v. Preferably, the tonicity agent will be employed in an amount to provide a final osmotic value of at least about 200 mOsm/kg, preferably from about 200 to about 450 mOsm/kg, more preferably from about 250 to about 400 mOsm/kg, and most preferably from about 280 to about 370 mOsm/kg.

If desired, one or more additional components can be included in the packaging solution. Such additional component or components are chosen to impart or provide at least one beneficial or desired property to the packaging solution. Such additional components may be selected from components that are conventionally used in one or more ophthalmic device care compositions. Examples of such additional components include cleaning agents, wetting agents, nutrient agents, sequestering agents, viscosity builders, contact lens conditioning agents, antioxidants, and the like and mixtures thereof. These additional components may each be included in the packaging solutions in an amount effective to impart or provide the beneficial or desired property to the packaging solutions. For example, such additional components may be included in the packaging solutions in amounts similar to the amounts of such components used in other, e.g., conventional, contact lens care products.

Useful sequestering agents include, but are not limited to, disodium ethylene diamine tetra acetate, alkali metal hexametaphosphate, citric acid, sodium citrate and the like and mixtures thereof.

Useful antioxidants include, but are not limited to, sodium metabisulfite, sodium thiosulfate, N-acetylcysteine, butylated hydroxyanisole, butylated hydroxytoluene and the like and mixtures thereof.

The method of packaging and storing an ophthalmic lens according to the present invention includes at least packaging the ophthalmic lens immersed in the aqueous contact lens packaging solution described above. The method may include immersing the ophthalmic lens in an aqueous contact lens solution prior to delivery to the customer/wearer directly following manufacture of the contact lens. Alternately, the packaging and storing in the solution of the present application may occur at an intermediate point before delivery to the ultimate customer (wearer) but following manufacture and transportation of the lens in a dry state, wherein the dry lens is hydrated by immersing the lens in the contact lens packaging solution. Consequently, a package for delivery to a customer may include a sealed container comprising one or more unused contact lenses immersed in an aqueous contact lens packaging solution according to the present application.

In one embodiment, the steps leading to the present ophthalmic device packaging system include (1) molding an ophthalmic device in a mold comprising at least a first and second mold portion, (2) removing the lens from the mold portions; (3) introducing the packing solution of this application and the ophthalmic lens into the container, and (4) sealing the container. Preferably, the method also includes the step of sterilizing the contents of the container. Sterilization may take place prior to, or most conveniently after, sealing of the container and may be effected by any suitable method known in the art, e.g., by balanced autoclaving of the sealed container at temperatures of about 120° C. or higher. Preferred packages are plastic blister packages, including a recess for receiving a contact lens and the package solution, where the recess is sealed with lidstock prior to sterilization of the package contents. Especially preferred packages would include a disposable package and package assembly for contact lenses. A single package comprises a flange with a well formed therein for holding a contact lens in solution. A flexible cover sheet extends over the flange and is sealed about the perimeter of the well to seal the lens and solution in the well. The cover sheet may be easily peeled from the flange by a user to access the lens held therein. First and second support structures are formed opposite each other and extend generally perpendicularly from the flange. The support structures are configured to stably support the package on a flat surface such as a table.

Each support structure includes a major wall and a minor wall lying in generally spaced, parallel planes to each other although the major and minor walls may interconnect or touch along one or more points thereof. In a preferred embodiment, the minor wall is located inwardly of a respective major wall.

A package assembly is also disclosed including a second package configured substantially the same as a first package wherein the first and second packages may be releasably attached to each other with the first and second support structures of each in meshing engagement with each other.

In certain embodiments, following extraction of unreacted monomers and any organic diluent, the shaped article, for example a custom contact lens, is optionally machined by various processes known in the art. The machining step includes lathe cutting a lens surface, lathe cutting a lens edge, buffing a lens edge or polishing a lens edge or surface. The present process is particularly advantageous for processes wherein a lens surface is lathe cut, since machining of a lens surface is especially difficult when the surface is tacky or rubbery.

Generally, such machining processes are performed before the article is released from a mold part. After the machining operation, the lens can be released from the mold part and hydrated. Alternately, the article can be machined after removal from the mold part and then hydrated.

The following examples are provided to enable one skilled in the art to practice the application and are merely illustrative of the application. The examples should not be read as limiting the scope of the application as defined in the claims.

EXAMPLES

All solvents and reagents are obtained from commercially available sources and used as received.
Analytical Testing Methods
A 4502 Mechanical Tester MTS Inston is used to measure the modulus, tensile strength, percent elongation and tear strength of the lenses. Samples are tested in a water bath comprising borate buffered saline.

Captive bubble contact angle data is collected on a First Ten Angstroms FTA 1000 Drop Shape Instrument. All samples are rinsed in HPLC grade water prior to analysis in order to remove components of the packaging solution from the sample surface. Prior to data collection the surface tension of the water used for all experiments is measured using the pendant drop method. In order for the water to qualify as appropriate for use, a surface tension value of 70-72 dynes/cm is expected. All lens samples are placed onto a curved sample holder and submerged into a quartz cell filled with HPLC grade water. Receding and advancing captive bubble contact angles are collected for each sample.

The receding contact angle is defined as the angle measured in water as the air bubble is expanding across the sample surface (water is receding from the surface). The advancing contact angle is defined as the angle measured in water as the air bubble is retracting from the lens surface (water is advancing across the surface).

All captive bubble data is collected using a high speed digital camera focused onto the sample/air bubble interface. The contact angle is calculated at the digital frame just prior to contact line movement across the sample/air bubble interface.

ESI-TOF MS: The electrospray (ESI) time of flight (TOF) MS analysis is performed on an Applied Biosystems Mariner instrument. The instrument operated in positive ion mode. The instrument is mass calibrated with a standard solution comprising lysine, angiotensinogen, bradykinin (fragment 1-5) and des-Pro bradykinin. This mixture provides a seven-point calibration from 147 to 921 m/z. The applied voltage parameters are optimized from signal obtained from the same standard solution. For exact mass measurements poly(ethylene glycol) (PEG), having a nominal $M_n$ value of 400 Da, is added to the sample of interest and used as an internal mass standard. Two PEG oligomers that bracketed the sample mass of interest are used to calibrate the mass scale. Samples are prepared as 30 μM solutions in isopropanol (IPA) with the addition of 2% by volume saturated NaCl in IPA. Samples are directly infused into the ESI-TOF MS instrument at a rate of 35 μL/min. A sufficient resolving power (6000 RP m/Δm FWHM) is achieved in the analysis to obtain the monoisotopic mass for each sample. In each analysis the experimental monoisotopic mass is compared to the theoretical monoisotopic mass as determined from the respective elemental compositions. In each analysis the monoisotopic mass comparison is less than 10 ppm error. It should be noted that uncharged samples have a sodium (Na) atom included in their elemental composition. This Na atom occurs as a necessary charge agent added in the sample preparation procedure. Some samples do not require an added charge agent since they contain a charge from the quaternary nitrogen inherent to their respective structure.

GC: Gas chromatography is performed using a Hewlett Packard HP 6890 Series GC System. Purities are determined by integration of the primary peak and comparison to the normalized chromatograph.

NMR: $^1$H-NMR characterization is carried out using a 400 MHz Varian spectrometer using standard techniques in the art. Samples are dissolved in chloroform-d (99.8 atom % D), unless otherwise noted. Chemical shifts are determined by assigning the residual chloroform peak at 7.25 ppm. Peak areas and proton ratios are determined by integration of baseline separated peaks. Splitting patterns (s=singlet, d=doublet, t=triplet, q=quartet, m=multiplet, br=broad) and coupling constants (J/Hz) are reported when present and clearly distinguishable.

Mechanical properties and Oxygen Permeability: Modulus and elongation tests are conducted according to ASTM D-1708a, employing an Instron (Model 4502) instrument where the hydrogel film sample is immersed in borate buffered saline; an appropriate size of the film sample is gauge length 22 mm and width 4.75 mm, where the sample further has ends forming a dog bone shape to accommodate gripping of the sample with clamps of the Instron instrument, and a thickness of 200±50 microns.

Oxygen permeability (also referred to as Dk) is determined by the following procedure. Other methods and/or instruments may be used as long as the oxygen permeability values obtained therefrom are equivalent to the described method. The oxygen permeability of silicone hydrogels is measured by the polarographic method (ANSI Z80.20-1998) using an O2 Permeometer Model 201T instrument (Createch, Albany, Calif. USA) having a probe comprising a central, circular gold cathode at its end and a silver anode insulated from the cathode. Measurements are taken only on pre-inspected pinhole-free, flat silicone hydrogel film samples of three different center thicknesses ranging from 150 to 600 microns. Center thickness measurements of the film samples may be measured using a Rehder ET-1 electronic thickness gauge. Generally, the film samples have the shape of a circular disk. Measurements are taken with the film sample and probe immersed in a bath comprising circulating phosphate buffered saline (PBS) equilibrated at 35° C.+/−0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. For silicone hydrogel films, it is frequently useful to employ a Teflon polymer membrane, e.g., having a circular disk shape, between the probe cathode and the film sample. In such cases, the Teflon membrane is first placed on the premoistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value. At least two Dk measurements per thickness, and meeting R2 value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−8.8% of the Repository values established by William J. Benjamin, et al., The Oxygen Permeability of Reference Materials, *Optom Vis Sci* 7 (12s): 95 (1997), the disclosure of which is incorporated herein in its entirety:

| MATERIAL NAME | REPOSITORY VALUES | LOWER LIMIT | UPPER LIMIT |
|---|---|---|---|
| Fluoroperm 30 | 26.2 | 24 | 29 |
| Menicon EX | 62.4 | 56 | 66 |
| Quantum II | 92.9 | 85 | 101 |

ABBREVIATIONS

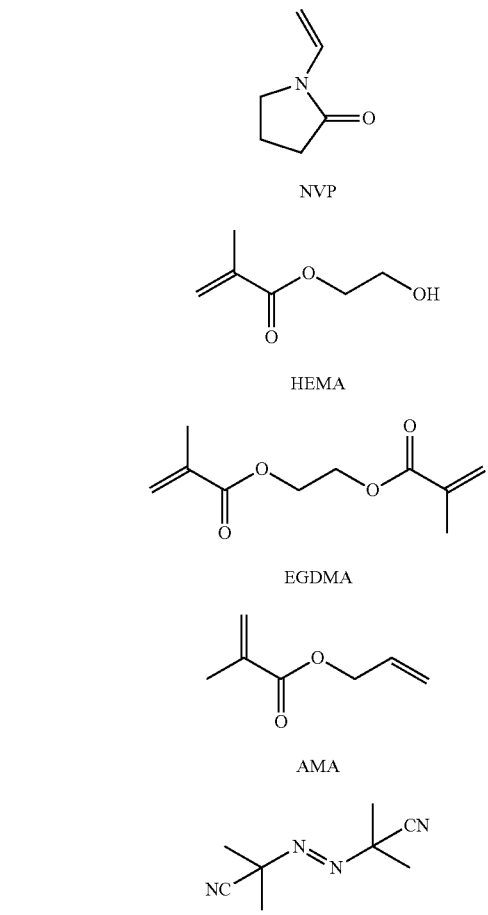

NVP

HEMA

EGDMA

AMA

AIBN

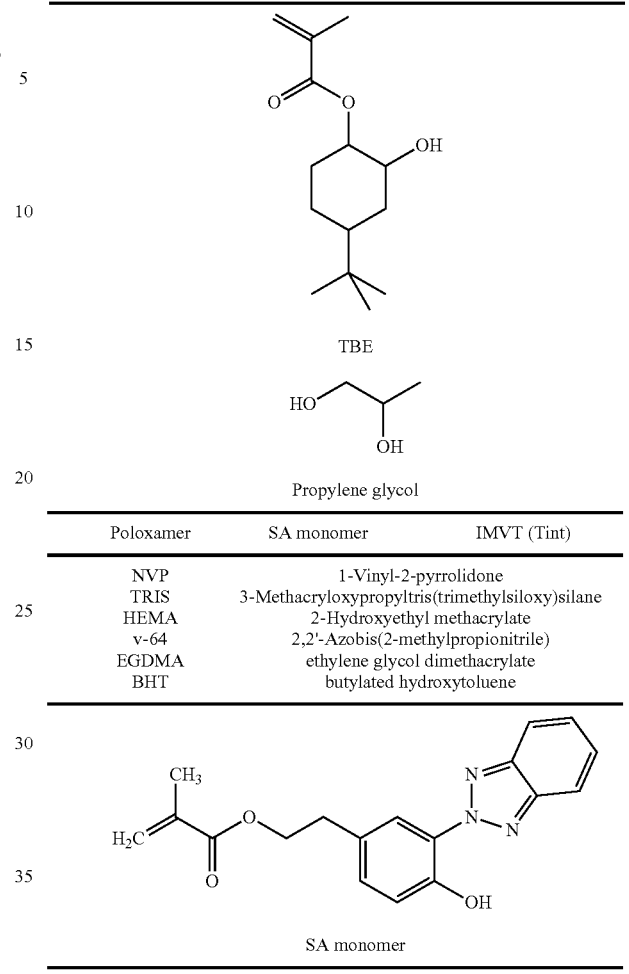

TBE

Propylene glycol

| Poloxamer | SA monomer | IMVT (Tint) |
|---|---|---|
| NVP | | 1-Vinyl-2-pyrrolidone |
| TRIS | | 3-Methacryloxypropyltris(trimethylsiloxy)silane |
| HEMA | | 2-Hydroxyethyl methacrylate |
| v-64 | | 2,2'-Azobis(2-methylpropionitrile) |
| EGDMA | | ethylene glycol dimethacrylate |
| BHT | | butylated hydroxytoluene |

SA monomer

Poloxamer F127-DM disclosed in U.S. Patent Application Publication No. 2003/0044468 the contents of which are specifically incorporated by reference herein.

IMVT

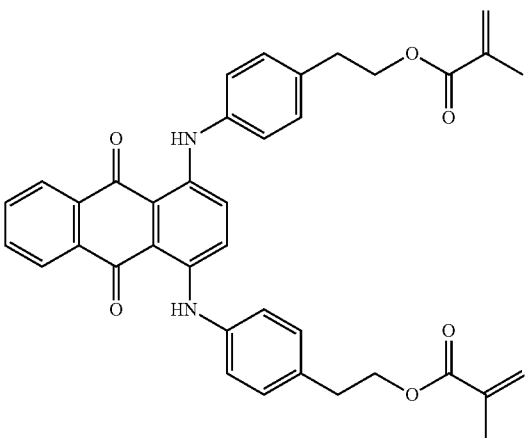 [SMILES: C=C(C)C(=O)OCCc1ccc(Nc2ccc(Nc3ccc(CCOC(=O)C(=C)C)cc3)c3c2C(=O)c2ccccc2C3=O)cc1]

IMVT TINT

AIBN  azobisisobutyronitrile

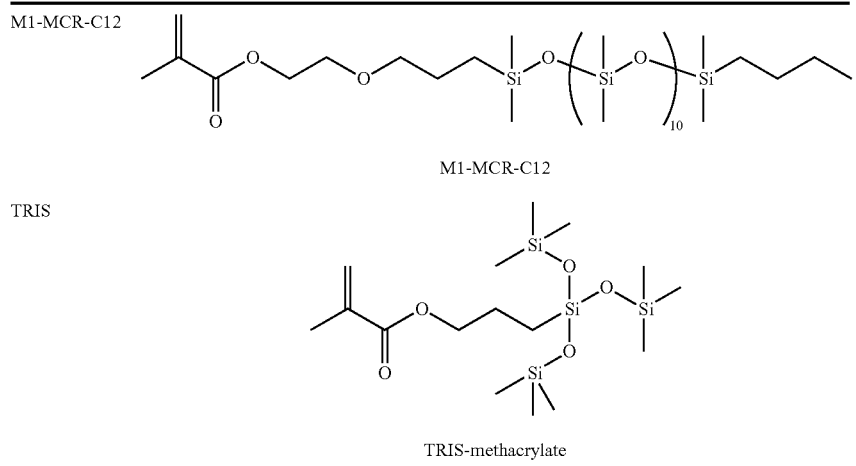

M1-MCR-C12

TRIS-methacrylate

Unless otherwise intentionally stated or made clear by its usage, all numbers used in the examples should be considered to be modified by the term "about" and to be weight percent.

Example 1

A monomer mixture is prepared by mixing the following components, N-vinyl-2-pyrrolidone (NVP) (90 weight percent); 4-t-butyl-2-hydroxycyclohexyl methacrylate (TBE) (10 weight percent), PLURONIC® F127 dimethacrylate (HLB=22, Mw~12600) (5 weight percent), ethylene glycol dimethacrylate (EGDMA) (0.15 weight percent), allyl methacrylate (AMA) (0.15 weight percent) and 2-hydroxypropylmethacrylate (HEMA) (2 weight percent) and a Vazo 64 initiator (0.5 weight percent). The monomeric mixture is cast in a polypropylene contact lens mold and thermally cured for about 4 hours.

Example 2

A monomer mixture is prepared by mixing the following components, NVP (90 weight percent); TBE (10 weight percent) and EGDMA (0.3 weight percent) and a Vazo 64 initiator (0.5 weight percent). To this mixture is added increasing amounts of O-(methacryloxyethyl)-N-(triethoxysilylpropyl) urethane (MTU) up to 15 weight percent. The monomeric mixture is cast in a polypropylene contact lens mold and thermally cured for about 4 hours.

Example 3

A monomer mixture is prepared by mixing the following components, NVP (90 weight percent); TBE (10 weight percent), EGDMA (0.3 weight percent) PLURONIC® F127 dimethacrylate (DM) (HLB=22, Mw~12600) (2 weight percent), and a Vazo 64 initiator (0.5 weight percent). The resultant monomeric mixture is cast in a polypropylene contact lens mold and thermally cured for about 4 hours.

Example 4

A monomer mixture is prepared by mixing the following components, NVP (90 weight percent); TBE (10 weight percent), EGDMA (0.3 weight percent) PLURONIC® F127 dimethacrylate (DM) (HLB=22, Mw~12600) (5 weight percent), and a Vazo 64 initiator (0.5 weight percent). The resultant monomeric mixture is cast in a polypropylene contact lens mold and thermally cured for about 4 hours.

Example 5

A monomer mixture is prepared by mixing the following components, NVP (90 weight percent); TBE (10 weight percent), EGDMA (0.3 weight percent PLURONIC® F127 dimethacrylate (DM) (HLB=22, Mw~12600) (10 weight percent), and a Vazo 64 initiator (0.5 weight percent). The resultant monomeric mixture is cast in a polypropylene contact lens mold and thermally cured for about 4 hours.

Example 6

A monomer mixture is prepared by mixing the following components, NVP (90 weight percent); TBE (10 weight percent), EGDMA (0.15 weight percent), HEMA-vinyl carbamate (HEMA-VC) (0.15 weight percent), PLURONIC® F38 dimethacrylate (DM) (HLB=31, Mw~4700) (2 weight percent), and a Vazo 64 initiator (0.5 weight percent). The resultant monomeric mixture is cast in a polypropylene contact lens mold and thermally cured for about 4 hours.

Example 7

A monomer mixture is prepared by mixing the following components, NVP (90 weight percent); TBE (10 weight percent), EGDMA (0.15 weight percent), HEMA-VC (0.15 weight percent), PLURONIC® F38 dimethacrylate (DM) (HLB=31, M~4700) (5 weight percent), and a Vazo 64 initiator (0.5 weight percent). The resultant monomeric mixture is cast in a polypropylene contact lens mold and thermally cured for about 4 hours.

Example 8

A monomer mixture is prepared by mixing the following components, NVP (90 weight percent); TBE (10 weight percent), EGDMA (0.15 weight percent), HEMA-VC (0.15 weight percent), PLURONIC® F38 dimethacrylate (DM) (HLB=31, Mw~4700) (10 weight percent), and a Vazo 64 initiator (0.5 weight percent). The resultant monomeric mixture is cast in a polypropylene contact lens mold and thermally cured for about 4 hours.

Example 9

A monomer mixture is prepared by mixing the following components, NVP (90 weight percent); TBE (10 weight percent), EGDMA (0.15 weight percent), HEMA-VC (0.15 weight percent), PLURONIC® F38 dimethacrylate (DM) (HLB=31, Mw~4700) (20 weight percent), and a Vazo 64 initiator (0.5 weight percent). The resultant monomeric mixture is cast in a polypropylene contact lens mold and thermally cured for about 4 hours.

Example 10

A monomer mixture is prepared by mixing the following components, NVP (53 weight percent); TEGDMA (1 weight percent), AMA (0.05 weight percent), HEMA (4.68 weight percent), TRIS (20 weight percent), M1-MCR-C12 (20 weight percent) and a Vazo 64 initiator (0.79 weight percent). The resultant monomeric mixture is cast in a polypropylene contact lens mold and thermally cured for about 4 hours.

Example 11

A monomer mixture is prepared by mixing the following components, N-vinyl-2-pyrrolidone (NVP) (27.5 weight percent); ethylene glycol dimethacrylate (EGDMA) (0.25 weight percent), allyl methacrylate (AMA) (0.15 weight percent); 2-hydroxypropylmethacrylate (HEMA) (57.4 weight percent); Glycerin (14.2 weight percent); and a Vazo 64 initiator (0.5 weight percent). The monomeric mixture is cast in a polypropylene contact lens mold and thermally cured for about 4 hours.

Experimental Details

A conventional hydrogel formulation monomer mixture is prepared according to Example 1 as a control. Then experimental formulations comprising the intentional addition of water in various amounts are made to the hydrogel formulation monomer mixture of Example 1 prior to casting the monomer mixture to form lenses. The hydrogel formulations intentionally containing added water in various amounts. That is an intentional amount of water (10%, 11%, 12%, 14%, 15%, 20% and 33%) water is added to the monomer mixture of Example 1. The mixture is allowed to stir in a capped amber bottle. The monomeric mixture is cast in a polypropylene contact lens mold and thermally cured for about 4 hours. The lenses are dry-released, soaked in water to remove unreacted components and excess diluent and packaged in borate buffer prior to autoclaving for sterilization. The lenses are then used to obtain analytical properties.

Water Content of Lenses According to Example 1 and as Modified with Various Amounts of Intentionally Added Water

TABLE 1

| Water content of lenses as a function of the amount of water added to the monomer mixture | |
|---|---|
| Samples | Water Content |
| Example 1 (Control) | 77.6 |
| 10% water | 79.18 |
| 12% water | 79.5 |
| 15% water | 81.1 |
| 20% water | 81.8 |
| 33% water | 82.9 |

As shown in Table 1, different amounts of water are added to the hydrogel formulation monomer mixture. The amount of water added is found to be directly proportional to the water content of the hydrogel after extraction and hydration. Control experiments are performed to determine the effect of water in the hydrogel mix.

In the control experiment, Example 10, a hydrogel formulation containing silicone material, i.e., M1-MCRC12 and TRIS, is taken as a negative control formulation. To the formulation of Example 10, 12% and 15% water is intentionally added to the monomer mixture and lenses are prepared and processed in the identical manner as before.

In another experiment, a conventional hydrogel material (Example 10) is used as a formulation which is also subjected to the intentional addition of water. Analytical results obtained from the experiment are listed below in Table 2.

TABLE 2

Analytical properties of conventional (Examples 1 and 11) and silicone containing (Example 10) hydrogels with either 12 or 15% water respectively.

| Properties | Example 11 + 12% water | Example 10 + 12% water | Example 1 + 12% water | Example 11 15% water | Example 10 15% water | Example 1 15% water |
|---|---|---|---|---|---|---|
| Modulus (g/mm2) | 27 (2) | — | 28 (2) | 24 (1) | — | 33 (7) |
| Tear Strength (g/mm) | 1.2 (0.6) | — | 2.03 (0.08) | 0.8 (0.1) | — | 2.13 (0.45) |
| Dk (Barrer) | 24 | — | 50 | 25 | — | 56 |
| Water Content (%) | 59.98 (0.18) | 79.9 | 79.37 | 60.25 (0.27) | 79.1 | 81.1 |
| Contact Angle Adv. | 65 (8.5) | — | 73 (4.5) | 56 (6.1) | — | 64 (1.3) |
| IPA Extractables | 19.6 (0) | 40.2 | 19.6 | 20.7 (0.2) | 43.2 | 19.9 |

After the lenses are cured in the oven, the silicone containing lenses of Example 10 with the intentional addition of water are gooey and sticky with noticeable difficulty in dry release. This results in poor quality lenses that had really high extractables (ca. 40%) as seen in the Table 2. The high extractables for samples with water show that in the presence of water, silicone containing lenses undergo inefficient and incomplete polymerization resulting in fragile material, most of which is lost during the extraction process. However, both the conventional hydrogel (Examples 1 and 11) formulation yielded in really robust materials that are easy to process, analyze and resulted in much lower extractables. This shows that the increase in water content of the lens while maintaining material robustness can be achieved by addition of water in the conventional hydrogel systems but not to silicone based hydrogel materials.

TABLE 3

Analytical properties of the control samples without water for Examples 1, 10 and 11.

| Properties | Example 11 Control | Example 10 Control | Example 1 Control |
|---|---|---|---|
| Modulus (g/mm2) | 28 (0.6) | — | 55 (3) |
| Tear Strength (g/mm) | 1.6 (0.9) | — | 2.38 (0.37) |
| Dk | 21 | — | 45 |
| Water Content (%) | 57.62 (0.14) | 57.4 | 78.04 |
| Contact Angle Adv. | 64 (3.8) | — | 53 (1.3) |
| IPA Extractables | 16.3 (0.2) | 28.6 | 18.7 |

Table 3 lists certain properties of the control samples which do not contain intentionally added water as part of the formulation. Although the formulation is prepared in the dry box, casting and processing of the lenses are performed on the bench top, which might lead in retention of moisture in the formulation from the environment. To assure that the control formulations do not have high amounts of water absorbed from the environment, Karl-Fisher titration experiment is performed to measure the amount of water present in the formulation.

Two polymerized formulations, the Example 1 control formulation and Example 1 with 12% intentionally added water are extracted in IPA and the water content measured by Karl Fisher to determine whether the additional water had evaporated or still remained in the lens after curing. Cured extracted then dried lenses (3) are placed in a vial with 3 mL anhydrous IPA. The vials are placed on the shaker overnight. The next day, the water content of the IPA is measured by Karl Fisher titration. The Karl-Fisher titration experiment performed to determine the water content in the formulation without added water showed that the amount of water absorbed by the formulation from moisture and external sources is very small (ca. 0.1%) (Table 4).

TABLE 4

Karl-Fisher titration experiment for measuring the amount of water present in the extraction medium (IPA), Example 1 without water and Example 1 with 12% water

| Sample | Water as detected by Karl-Fisher |
|---|---|
| Isopropyl alcohol (IPA) | 0.04% |
| Example 1 Control | 0.11% |
| Example 1 with 12% water | 0.15% |

Additionally, a solid state NMR experiment is performed to see if added water could be detected in the lens. Solid state NMR experiment is performed on Example 1 lenses that are spiked with 20% $D_2O$ (NMR solvent 80% Water/20% $D_2O$). The lenses are casted and cured as mentioned previously. The dry lenses are then used for solid state NMR. From the solid state NMR, $D_2O$ could not be detected in the lens (FIG. 1). Additional signal averaging is performed to increase the sensitivity of the experiment but $D_2O$ is still undetectable leading to believe that the amount of $D_2O$ in the dry lens is very small (FIG. 1). This result is consistent with the Karl-Fisher experiment, which also showed that the amount of water present in the lens is very small.

As shown in FIG. 1, Solid state NMR experiment of Example 1 lenses spiked with 20% D/O, wherein the bottom three spectra are control samples, where $D_2O$ is mixed with various amounts of water to yield solution with various concentration of $D_2O$ (100%, 50% and 10% respectively) such that it can be used as a calibration tool to detect the sensitivity of the amount of $D_2O$ in the sample. The top three spectra are the solid state N s of Example 1 lenses with 20% $D_2O$, either with or without signal averaging.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A hydrogel contact lens formed of a thermally polymerized monomer mixture, the monomer mixture comprising intentionally added water, a hydrophilic monomer, a strengthening monomer, a crosslinker, a thermal initiator and a UV blocker; wherein the monomer mixture does not contain any silicon containing materials and wherein the polymerized monomer mixture is a hydrogel that is optically clear and useful as a hydrogel contact lens in a human eye, and wherein the monomer mixture includes N-vinylpyrrolidone (NVP), 2-hydroxyethyl methacrylate (HEMA), 4-(tertbutyl)-2-hydroxylcyclohexyl methacrylate (TBE) and poloxamer dimethacrylate.

2. The hydrogel contact lens of claim 1 wherein the monomer mixture prior to polymerization comprises 10 to 33 percent by weight of intentionally added water.

3. The hydrogel contact lens of claim 1 wherein the monomer mixture prior to polymerization comprises 10 to 20 percent by weight of intentionally added water.

4. The hydrogel contact lens of claim 1 wherein the monomer mixture prior to polymerization comprises 10 to 15 percent by weight of intentionally added water.

5. The hydrogel contact lens of claim 1 wherein the monomer mixture prior to polymerization comprises 15 to 33 percent by weight of intentionally added water.

6. The hydrogel contact lens of claim 1 wherein the monomer mixture prior to polymerization comprises 15 to 20 percent by weight of intentionally added water.

7. The hydrogel contact lens of claim 1 wherein the monomer mixture prior to polymerization comprises 20 to 33 percent by weight of intentionally added water.

8. The hydrogel contact lens of claim 1, wherein the monomer mixture further comprises a tint and a crosslinker and hydrating agent.

9. A hydrogel contact lens formed of a polymerized monomer mixture, wherein the monomer mixture comprises: intentionally added water; N-vinylpyrrolidone (NVP); 2-hydroxyethyl methacrylate (HEMA); ethyleneglycoldimethacrylate (EGDMA); allyl methacrylate (AMA); 4-(ter-tbutyl)-2hydroxylcyclohexyl methacrylate (TBE); poloxamer dimethacrylate; azobisisobutyronitrile (AIBN) as a thermal initiator; SA monomer as a UV blocker; and IMVT as a tint, and wherein the monomer mixture does not contain any silicon containing materials.

10. The hydrogel contact lens of claim 9, wherein the monomer mixture further comprises a diluent.

11. The hydrogel contact lens of claim 10, wherein the diluent is propylene glycol.

12. The hydrogel contact lens of claim 9 contained in a package, wherein the package comprises a flange with a well formed therein and a flexible cover sheet extending over the flange and sealed about the perimeter of the well, wherein the hydrogel contact lens is immersed in an aqueous solution and held in the well.

13. The hydrogel contact lens of claim 9, wherein the monomer mixture prior to polymerization comprises 10 to 33 percent by weight of intentionally added water.

14. The hydrogel contact lens of claim 9, wherein the monomer mixture prior to polymerization comprises 10 to 15 percent by weight of intentionally added water.

\* \* \* \* \*